Aug. 18, 1942.   K. A. KILLAM   2,293,508

DYNAMO-ELECTRIC MACHINE

Filed March 29, 1941

Inventor:
Kenneth A. Killam,
by Harry E. Dunham
His Attorney.

Patented Aug. 18, 1942

2,293,508

UNITED STATES PATENT OFFICE 2,293,508

DYNAMOELECTRIC MACHINE

Kenneth A. Killam, Schenectady, N. Y., assignor to General Electric Company, a corporation of New York Application March 29, 1941, Serial No. 385,921

4 Claims. (Cl. 171—252)

My invention relates to improvements in dynamo-electric machines and to an improved ventilating system therefor.

In the design of dynamo-electric machines, it is essential that the temperature of the machine be kept within safe limits in order to minimize the possibility of break-down of the electrical insulation. I have also found in dynamo-electric machines; and particularly in motors which have a relatively high output per pound, that upon the rotor iron reaching a high temperature, the heat will be transmitted to the shaft and thence along the shaft to the bearings causing overheating and even failure of the bearings.

It is, therefore, an object of my invention to provide an improved and simplified ventilating system for a dynamo-electric machine.

Another object of my invention is to provide an improved rotatable member construction for a dynamo-electric machine.

A further object of my invention is to provide an improved rotatable spider construction for a dynamo-electric machine which will reduce the heat transfer to the shaft.

Further objects and advantages of my invention will become apparent from the following description referring to the accompanying drawing, and the features of novelty which characterize my invention will be pointed out with particularity in the claims annexed to and forming a part of this specification.

Figure 1:
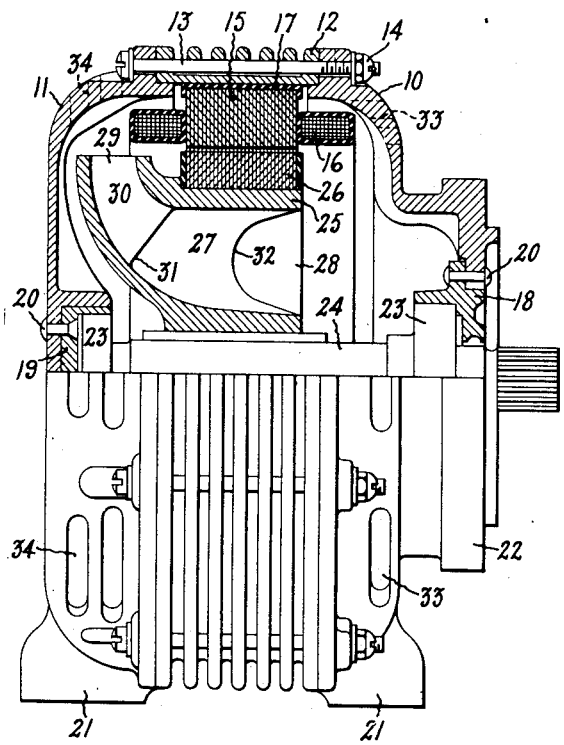
Figure 2:
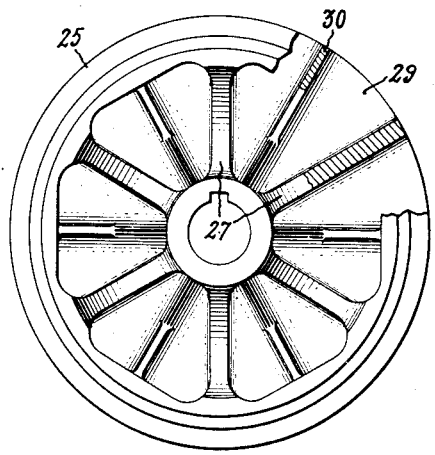
Figure 3:
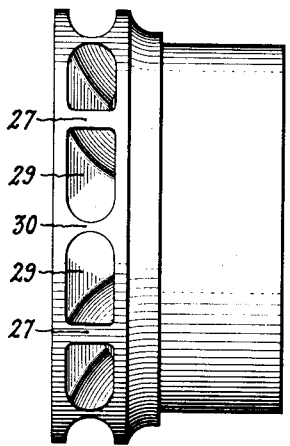
Figure 4:
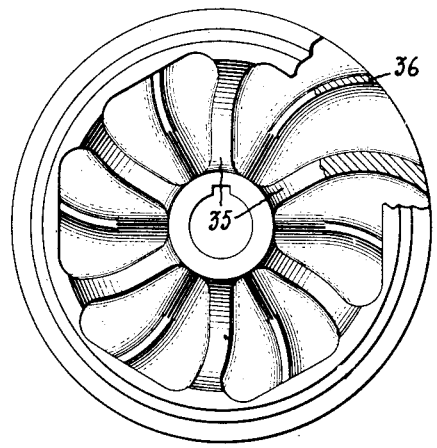

In the drawing, Fig. 1 is a side elevation, partly in section, of a dynamo-electric machine provided with an embodiment of my invention; Fig. 2 is an end view, partly broken away, of the intake side of the rotatable member of the dynamo-electric machine illustrated in Fig. 1; Fig. 3 is a side view of the rotatable member of the dynamo-electric machine illustrated in Figs. 1 and 2, and Fig. 4 is an end view, partly broken away, of a modification of the rotatable member illustrated in Figs. 2 and 3.

Referring to the drawing, in Fig. 1 I have illustrated a dynamo-electric machine including a stationary member having two end shields 10 and 11 connected together by a frame member 12 extending peripherally about the central portion of the machine. In order to decrease its weight and improve its heat radiation characteristics, the frame member is formed with a plurality of ribs on its outer periphery. This ribbing also increases the stiffness of the frame member and therefore decreases the amount of material which must be used to form the frame member. The stationary member frame assembly may be made of any suitable material such as aluminum or magnesium to decrease further the weight thereof. The end shields and the frame member are held as a unitary assembly by means of a plurality of bolts 13 which have nuts 14 threaded on the ends thereof. The stationary member also includes a core formed of a plurality of laminations 15 of ferro-magnetic material having slots through which windings 16 extend. The laminations are clamped together by a stainless steel shell 17 arranged about the outer periphery of the core and having overhanging sides of which extend down over the outer punchings. This shell may be made in any suitable manner such as by spinning over the sides, and is made of stainless steel, as I have found that it is desirable that the metal or alloy which contacts the aluminum frame should be non-magnetic to minimize corrosion. Both the end shields 10 and 11 are provided with heat-treated nickel steel bearing cups 18 and 19, respectively. These cups are held in the end shields by rivets 20, or in any other suitable manner, and in this way are prevented from becoming loosened because of the difference in thermal expansion between the aluminum and the steel. Both of the end shields have integral feet members 21 and one of the end shields has a flange 22 so that the dynamo-electric machine may be flange mounted, or other driven equipment may be mounted on the flange, if desired. The bearing cups are arranged to support bearings 23 in which a rotatable shaft 24 of the rotatable member of the machine is mounted. This shaft carries a rotatable member spider 25 on which laminations 26 are secured and supported and form a core in which a cast squirrel cage winding is arranged to react electro-dynamically with the stationary exciting structure.

In order to provide an improved arrangement for cooling or ventilating the machine, I provide a plurality of ventilating passages in the rotatable member 25 which are defined by a plurality of radially and axially extending fan blades 27. These passages have axially extending intake openings 28 and radially extending exhaust openings 29 with the fan blades 27 extending substantially the entire length from the intake openings 28 to the exhaust openings 29, as shown in Fig. 1, thereby providing good heat transfer surfaces in the stream of the cooling air. In order to minimize swirl of the air at the outlet openings, each of the rotor passages is provided with an intermediate fan blade 30 which extends from the exhaust opening toward the intake opening for a portion of the length of the ventilating passage. These blades all extend substantially radially to provide the same ventilation for either direction of rotation. In the embodiment of my invention illustrated in Fig. 1, these intermediate fan blades 30 stop at a point 31 about midway between the exhaust openings and an undercut portion 32 of the blades 27. This arrangement minimizes turbulence of ventilating medium near the intake openings 28 and reduces the air intake losses. Relatively quiet operation is maintained by keeping the air velocity substantially constant as it passes through the passageways in the rotor, as the cross sectional area of the passages from their intake end to the exhaust end are substantially constant. This is possible, although the exhaust openings are relatively smaller across in an axial direction than the intake openings are across in a radial direction, since these exhaust openings are further out on the periphery of the rotor than the intake openings so that a larger peripheral surface is available to be formed into the exhaust openings. Another advantage of directing the air axially through the large passages between the spider fan blades is that it effectively removes the heat from the rotatable member core and winding before it reaches the shaft 24, and the exhaust portion of the passage directs the air radially outwardly over the adjacent end turns of the winding to assist in cooling the same and away from the adjacent bearing to prevent the transfer of heat from the air to the bearing.

In order to provide for the circulation of fresh air through the dynamo-electric machine the end bells 10 and 11 are each provided with a plurality of peripherally extending slots 33 and 34, respectively, so that rotation of the rotatable member causes air to be drawn in through the slots 33 and discharged out through the slots 34. In passing from the slots 33 to the intake passages 28 the air is circulated past the end turns 16 in order to cool them, passes through the passageways of the rotor and absorbs the heat from losses in the rotatable member, copper and iron, then is discharged from the exhaust openings 29 and passes over the adjacent end turns of the winding 16 and out through the passages 34. I have found that with a dynamo-electric machine cooled by the system as described above that a marked decrease in temperature rise obtains for a machine with equivalent output over methods of cooling which have heretofore been used.

In Fig. 4 is shown a modified rotatable member spider wherein fan blades 35 and 36 are curved to provide a more efficient impeller for one direction of rotation. In addition, the radially extending part of the blades 35 and 36 may be curved to form a helix. The blade may also be curved or spiraled in an axial direction, if desired.

In view of the foregoing, it will be seen that I have provided an improved dynamo-electric machine construction for dissipating the iron and copper losses in the stationary member as well as the rotatable member, in order to obtain a maximum output for a given size machine and so as to minimize the possibility of overheating of the insulation and bearings.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. A dynamo-electric machine including a stationary member having a winding, a rotatable member having a core with a plurality of fan blades arranged to support said core and defining ventilating passages for said rotatable member, and an intermediate fan blade between each of said first-mentioned fan blades extending for only a portion of the length of said ventilating passages, said fan blades being constructed and arranged to draw air in over one end of said stationary member winding and to exhaust air outwardly over the other end of said winding.

2. A dynamo-electric machine provided with a stationary member having a winding, a rotatable member provided with a core and a plurality of ventilating passages each having an intake end and an exhaust end, said passages being defined by a plurality of fan blades arranged to support said core, an intermediate fan blade between said first-mentioned fan blades and extending from said exhaust end and towards said intake end for only a portion of the length of said ventilating passages, said first-mentioned fan blades each having at their intake ends an under-cut portion so as to reduce turbulence and being constructed and arranged to draw air in over one end of said stationary member winding and to exhaust air outwardly over the other end of said winding.

3. A dynamo-electric machine including a stationary member having a winding, a rotatable member provided with a core and a plurality of ventilating passages each having an intake end and an exhaust end, said passages being defined by a plurality of fan blades arranged to support said core, a plurality of ventilating slots in said stationary member near said intake and exhaust ends of said passages, and intermediate fan blades between said first-mentioned blades and extending from said exhaust end toward said intake end of said passages for only a portion of the length of said rotatable member ventilating passages, said rotatable member fan blades being constructed and arranged to cause a fan action for drawing air through said slots near said intake passages and discharged through said slots near said exhaust passages and over said stationary member winding.

4. A dynamo-electric machine including a stationary member having a winding, ventilating slots in the stationary member adjacent the end turns of said winding, a rotatable member provided with a plurality of ventilating passages, each of said passages being defined by a plurality of fan blades and having an intake end and an exhaust end, and intermediate fan blades between said first-mentioned fan blades extending from said exhaust end and toward said intake end of said passages for only a portion of the length of said rotatable member passages, said rotatable member upon rotation causing a fan action so that air is drawn in through said ventilating slots adjacent to end turns of said winding to said intake end of said ventilating passages in said rotatable member and discharged through said exhaust ends of said rotatable member ventilating passages to the stationary member ventilating slots adjacent said other end turns.

KENNETH A. KILLAM.